Dec. 22, 1959  O. SCHUELLER  2,918,209
MOTOR-COMPRESSOR UNIT
Filed May 14, 1957  4 Sheets-Sheet 1
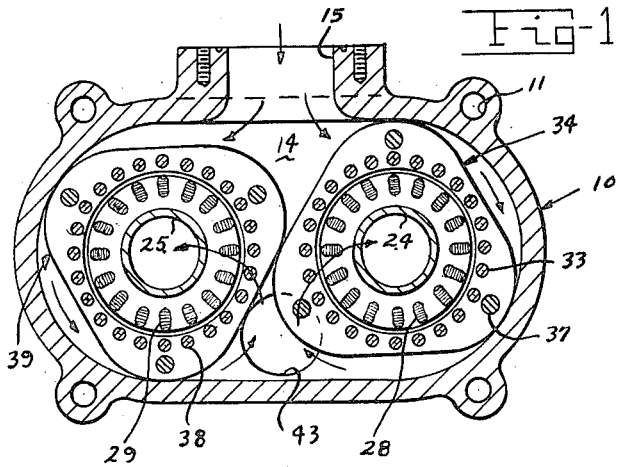
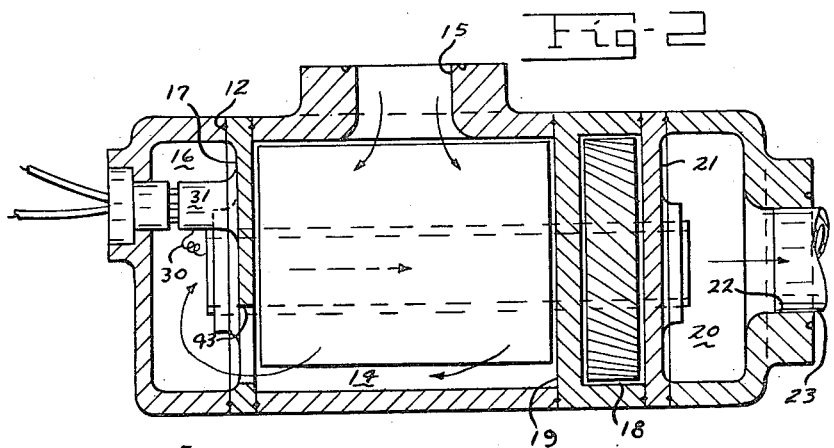
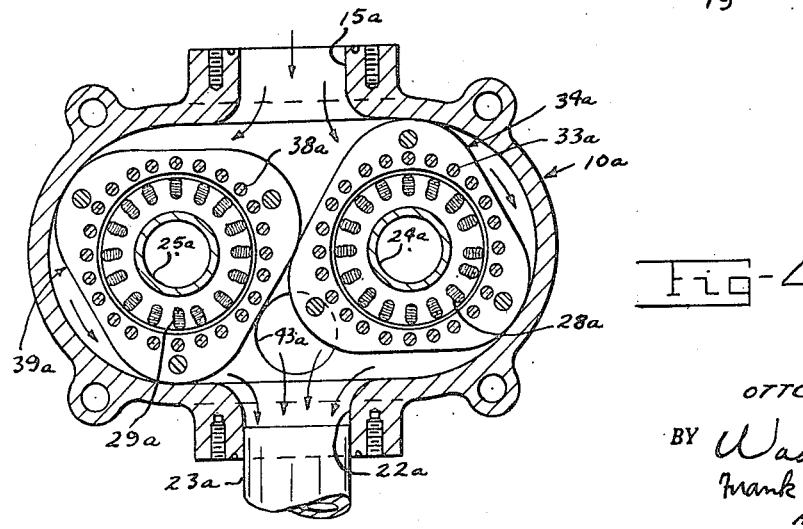
INVENTOR.
OTTO SCHUELLER
BY Wade Koontz
Frank C. Leach Jr. and
ATTORNEYS

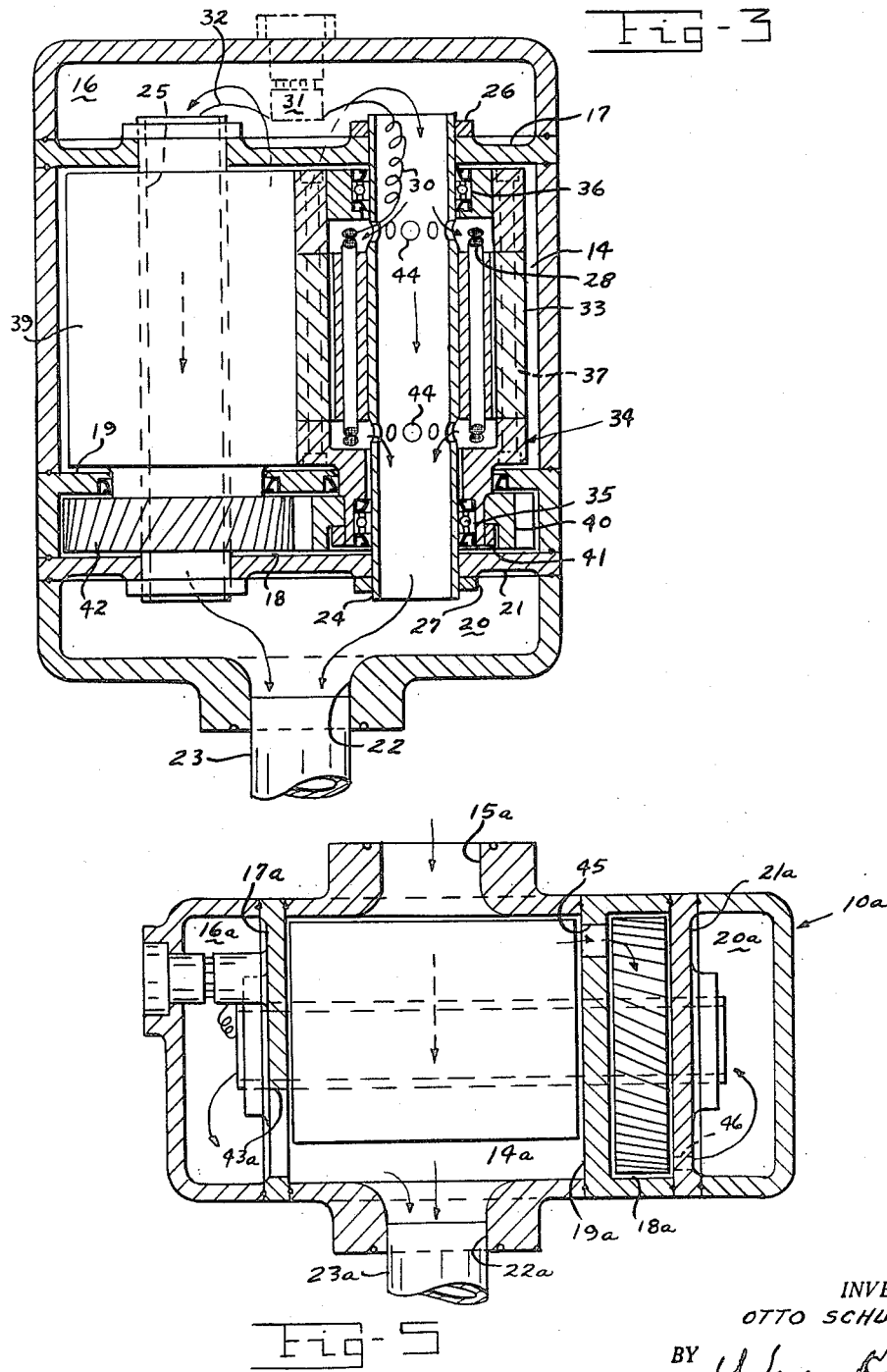

Dec. 22, 1959    O. SCHUELLER    2,918,209
MOTOR-COMPRESSOR UNIT
Filed May 14, 1957    4 Sheets-Sheet 3

INVENTOR.
OTTO SCHUELLER
BY
ATTORNEYS

United States Patent Office 2,918,209
Patented Dec. 22, 1959

2,918,209

MOTOR-COMPRESSOR UNIT

Otto Schueller, Fairborn, Ohio

Application May 14, 1957, Serial No. 659,184

5 Claims. (Cl. 230—239)

(Granted under Title 35, U.S. Code (1952), sec. 266)

The invention described herein may be manufactured and used by or for the United States for governmental purposes without payment to me of any royalty thereon.

This invention relates to an electric motor-compressor unit and, more particularly, to an oxygen motor-compressor unit for use at high altitudes.

The occupants of aircraft operating at high altitude must be supplied oxygen under pressure because of the low atmospheric pressure. However, approximately only five percent of oxygen supplied to the occupant is consumed and the other ninety-five percent may be reused by employing a closed respiratory system. In such a system, a compressor, which must be driven by a motor, supplies the oxygen to the aircraft occupant. The exhaled air, which contains approximately ninety-five percent oxygen with the remainder being carbon dioxide and water vapor, is directed into a chemical means that removes the carbon dioxide and water vapor. The oxygen is then cooled and returned to the inlet of the compressor where its pressure is again increased for supply to the aircraft occupant. The remaining oxygen, which is needed to replace the used oxygen, is introduced into the closed respiratory system from an oxygen source through a regulator, which maintains the needed oxygen pressure in the system depending on the altitude at which the aircraft is operating.

Such a closed respiratory system requires a motor-compressor unit, which operates satisfactorily at high altitudes. The present motor-compressor units are of a type wherein only the compressor is disposed in a housing and a shaft connects the motor to the compressor to drive the compressor. In such a unit, there exists the problem of the wires of the motor being damaged and short circuits resulting therefrom because of ionization resulting from the low air pressure existing at the high altitude at which the aircraft is operating. Because of the presence of oxygen, suitable lubricants cannot be used for a seal around the shaft, which connects the motor to the compressor, since the oxygen would produce combustion. This type of motor-compressor unit also would tend to overheat because of the high temperature at the surface of the plane due to the aerodynamic friction of the aircraft at high speeds. The lack of air at the high altitude also prevents any cooling of the motor by convection.

The present invention satisfactorily solves these problems so that a closed respiratory system may be employed at high altitude with a large increase in oxygen economy. It will be understood that the prior method for supplying oxygen at high altitude was to maintain a full supply of oxygen including approximately 95% of which was exhaled unused to the atmosphere. The present invention eliminates the cooling problem by using the oxygen flowing through the compressor to cool the motor. The motor is disposed within the housing of the compressor so that there is no problem of ionization. The positioning of the motor within the housing eliminates any need of sealing the shaft connecting the compressor to the motor.

An object of the present invention is to provide a unitary motor-compressor combination.

Another object of this invention is to provide an electric motor that operates satisfactorily at high altitudes.

A further object of this invention is to provide a motor-compressor unit that is lightweight and inexpensive to make compared to present units.

Still another object of this invention is to provide a motor-compressor unit that utilizes synchronous meshed gears as a gear pump for a separate cooling stream to cool the motor.

Other objects of this invention will be readily perceived from the following description.

This invention relates to an electric motor-compressor unit comprising a casing having an inlet and an outlet. A pair of stators are mounted in the casing with a rotor adjacent to each of the stators. The rotors are connected together by suitable means to produce a synchronous drive therebetween and an impeller is secured to each of the rotors. The impellers cooperate to pump fluid from the inlet through the outlet at a pressure increase.

The attached drawings illustrate preferred embodiments of the invention, in which Fig. 1 is a sectional view of a motor-compressor unit;

Fig. 2 is a vertical sectional view of the unit of Fig. 1;

Fig. 3 is a horizontal sectional view partly in plan of the unit of Fig. 1;

Fig. 4 is a sectional view of another form of motor-compressor unit;

Fig. 5 is a vertical sectional view of the unit of Fig. 4;

Figure 6:
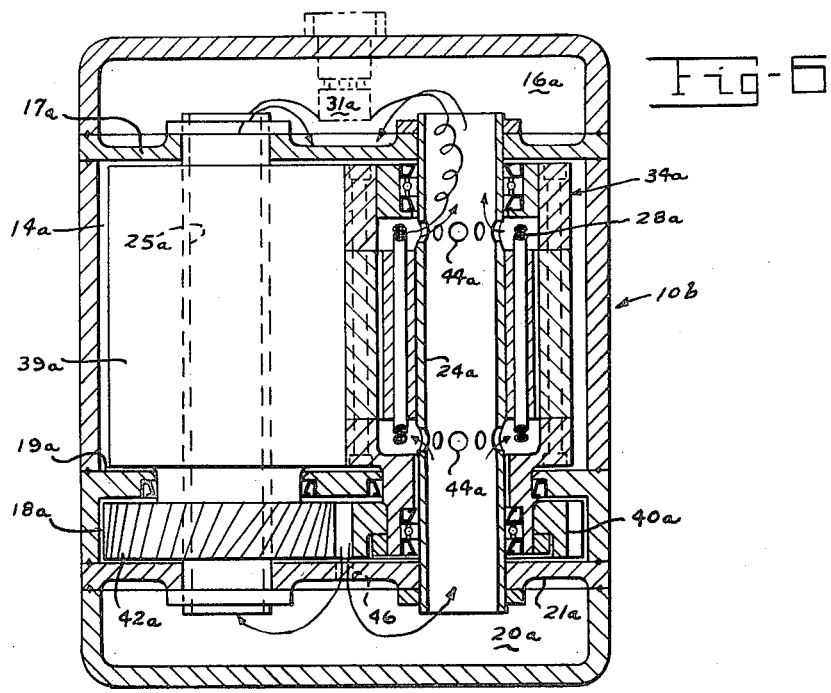
Fig. 6 is a horizontal sectional view partly in plan of the unit of Fig. 4.

Referring to the drawings and particularly to Figs. 1, 2 and 3, there is shown a casing or housing 10 comprising a plurality of portions secured together by suitable means such as bolts and cooperating nuts (not shown) passing through openings 11 formed in the portions of the housing 10. A sealing ring 12, preferably of rubber, is disposed between each of the portions of the housing 10 to prevent leakage of the fluid such as oxygen.

A plurality of chambers are formed in the housing 10 including a central chamber 14 having an inlet 15 through which oxygen is supplied. An end chamber 16 is separated from the central chamber 14 by a common wall 17. An intermediate chamber 18 is disposed adjacent the other end of the central chamber 14 and separated therefrom by a common wall 19. The housing 10 also has an end chamber 20, which is separated from the intermediate chamber 18 by a wall 21. The end chamber 20 has an outlet 22 through which the oxygen flows into a conduit 23 connected to the mask of the wearer, for example.

A pair of hollow shafts 24 and 25 is mounted in the housing 10 and supported by the walls 17 and 21. Each of the shafts 24 and 25 has its ends communicating with the end chambers 16 and 20. The shaft 24 is held in position by a pair of nuts 26 and 27; the hollow shaft 25 is secured by similar nuts.

A laminated stator 28 including a set of multiphase induction motor field windings is secured concentrically on the hollow shaft 24 to form part of an induction driving motor. A similar stator 29 including a set of multiphase field windings is mounted on the shaft 25 to form part of a second induction driving motor. A plurality of electrical conductors, one only shown, indicated at 30 connect the field windings on the stator 28 to a plug 31 which is connected to a suitable multiphase alternating current source not shown. Similarly a plurality of electrical conductors 32, only one shown, connect the windings on the stator 29 to the plug 31 and external source of alternating current. The respective stator windings are so connected that two oppositely rotating magnetic fields are generated.

A rotor 33 includes a plurality of the usual short circuited conductors. The rotor 33 is preferably laminated and is rotatably mounted on the stationary shaft by bearings 35 and 36 (Fig. 3). The rotor is externally contoured to form a positive displacement pump impeller indicated at 34. The rotor laminations and end plates are maintained assembled by through bolts 37. The rotor 33 cooperates with the stator 28 to operate as a conventional induction motor and in which the rotor also serves as a pump impeller 34.

A laminated rotor 38, having short circuited conductors and otherwise identical to rotor 33 is mounted by bearings for free rotation on the stationary hollow shaft 25 and is externally contoured as at 39 to form a pump impeller. The rotor 38 cooperates with stator 29 to form an induction motor which drives the rotor also serving as impeller 39.

The external contour of the impellers 34 and 39 may be made in the form of the well known Roots type blower or other cooperating form such that each rotor is substantially in contact with the pump casing and that the sum of the radii to the point of rotor contacts is a constant. The rotor contours are preferably constructed in accordance with an equation involving the law of sines such as described and claimed in my copending application Serial Number 659,185, filed May 14, 1957.

The pump rotors are designed to run with a small clearance of the order of two thousandths of an inch from each other and from the casing walls and since the rotors do not drive each other synchronizing gears are required. One synchronizing gear 40 is fixed on a tubular extension of rotor 34 within the housing chamber 18 and retained by a nut 41. A second synchronizing gear 42 is similarly housed in casing chamber 18 in mesh with gear 40 and secured to rotor 39 in the same manner as used to secure gear 40. The synchronizing gears insure that the impellers rotate in opposite directions at the same speed and in the proper phase relation.

One set of the openings 44 in the shaft 24 is disposed adjacent one end of the stator 28 and a second set of the openings 44 is disposed adjacent the other end of the stator 28 whereby the oxygen flows from the interior of the shaft 24 through one set of the openings 44 into the stator 28 and back to the interior of the shaft 24 through the other set of openings 44, as shown by the arrows in Fig. 3. The gas flowing through and over the respective motor stators absorbs heat developed in the stator windings and prevents any excessive temperature rise therein.

The energization of the motor is accomplished by supplying current to the stators 28 and 29 through the plug 31. The energization of the stators 28 and 29 results in the rotors 33 and 38 revolving to rotate the impellers. If one of the motors ceases to operate, both of the impellers continue to operate since they are interconnected by the gears 40 and 42. Since the conduit 23 is at a higher pressure than the oxygen entering the inlet 15, the impellers increase the pressure of the oxygen while pumping it therethrough.

Another embodiment of the motor-compressor unit of the present invention is shown in Figs. 4 and 6 wherein a housing 10a is connected in the same manner as the housing 10 of Figs. 1 to 3. The housing 10a has a central chamber 14a and an end chamber 16a separated from the central chamber by a wall 17a. The housing 10a also has an intermediate chamber 18a, which is separated from the central chamber 14a by a wall 19a, and an end chamber 20a separated from the intermediate chamber 18a by a wall 21a. Thus, the arrangement of the chambers in the housing 10a is similar to the arrangement of the chambers in the housing 10 of Figs. 1 to 3. However, the central chamber 14a has both inlet 15a and outlet 22a.

A pair of hollow shafts 24a and 25a is fixedly mounted in the housing 10a in the same way as the shafts 24 and 25 of Figs. 1 to 3. The stators 28a and 29a are secured to the shafts 24a and 25a, respectively. A rotor 33a, which forms part of an impeller 34a, is rotatably mounted on the shaft 24a. Similarly, the rotor 38a is rotatably mounted on the shaft 25a and forms part of an impeller 39a.

In the modification of Figs. 4 to 6, the wall 19a has an opening 45 (see Fig. 5) therein to permit oxygen flow from the central chamber 14a into the intermediate chamber 18a. The wall 21a has an opening 46 to allow oxygen flow from the intermediate chamber 18a to the end chamber 20a.

In the operation of the modification of Figs. 4 to 6, the main portion of the oxygen is pumped directly by the impellers from the inlet 15a through the outlet 22a to a conduit 23a connected thereto. However, a portion of the oxygen passes through the opening 45 into the intermediate chamber 18a. Synchronous gears 40a and 42a, which are adjustably secured to the impellers 34a and 39a, cooperate to serve as a pump to direct the oxygen flowing through the opening 45 into the end chamber 20a through the opening 46. The portion of the oxygen pumped by the gears 40a and 42a into the end chamber 20a flows therefrom through the hollow shafts 24a and 25a into the end chamber 16a. This oxygen rejoins the oxygen flowing through the central chamber 14a and the outlet 22a by flowing through an opening 43a in the wall 17a.

As the oxygen flows through the hollow shafts 24a and 25a, a portion of the oxygen flows through a set of circumferential openings 44a in each of the shafts 24a and 25a into the stators 28a and 29a to cool the stators. A second set of circumferential openings 44a, which is spaced from the first set, in each of the shafts 24a and 25a allows the oxygen to return to the interior of the hollow shafts 24a and 25a from the stators. Thus, the arrangement of Figs. 4 to 6 employs a different flow pattern of the oxygen for cooling the stators. Since the structures of Figs. 1 to 3 and Figs. 4 to 6 are substantially similar, the similar parts have been identified by the same numerals except with the addition of the suffix "a" to the parts of Figs. 4 to 6. It will be understood that all of the parts identified in Figs. 1 to 3 are not identified by numerals in Figs. 4 to 6 but produce the the same functions in the same way.

Figure 7:
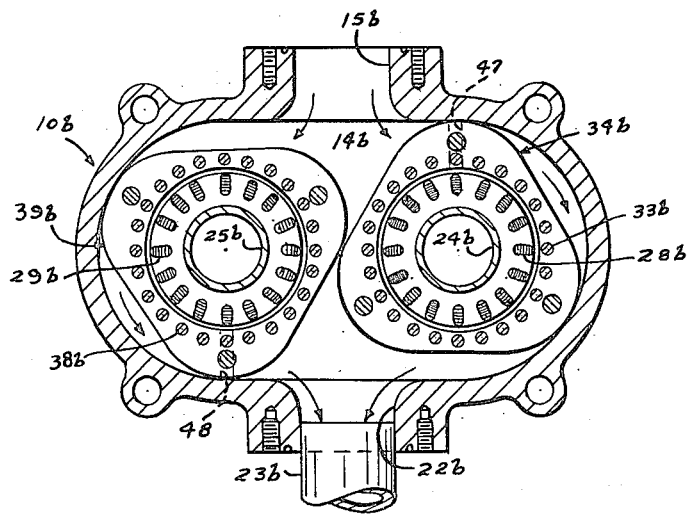
Fig. 7 is a sectional view of another modification of the motor-compressor unit of the present invention.
Figure 8:
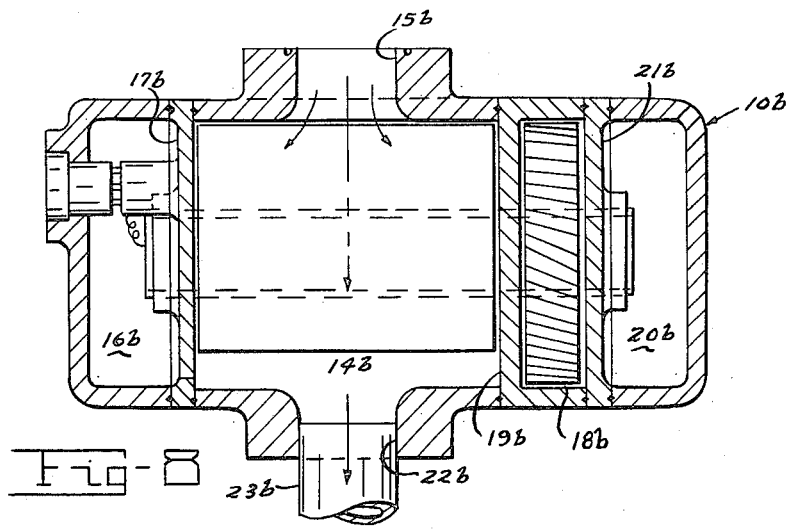
Fig. 8 is a vertical sectional view of the unit of Fig. 7.
Figure 9:
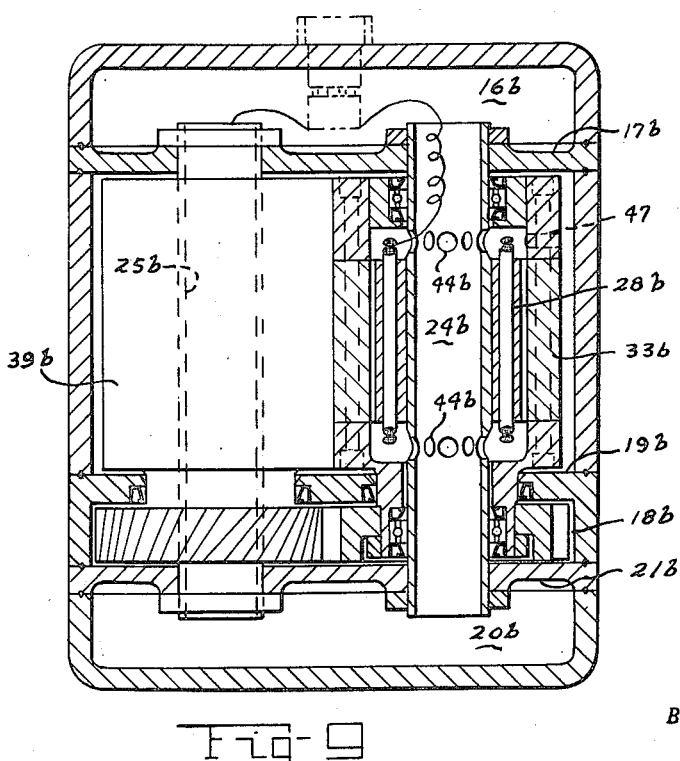
Fig. 9 is a horizontal sectional view partly in plan of the unit of Fig. 7.

Figs. 7 to 9 disclose another embodiment of a motor-compressor unit of the present invention including a housing 10b, which is formed similarly to the housings 10 and 10a. The housing 10b includes a central chamber 14b, end chambers 16b and 20b, and an intermediate chamber 18b. A wall 17b separates the end chamber 16b from the central chamber 14b and a wall 19b separates the central chamber 14b from the intermediate chamber 18b. A wall 21b separates the end chamber 20b from the intermediate chamber 18b.

A pair of hollow shafts 24b and 25b is fixedly mounted in the housing 10b and have their ends communicating with the end chambers 16b and 20b. Stators 28b and 29b are fixedly mounted on the shafts 24b and 25b, respectively. Rotors 33b and 38b cooperate with the stators, as previously described with respect to Figs. 1 to 3 and 4 to 6, and form part of impellers 34b and 39b, respectively, to which each is connected. The oxygen is pumped from an inlet 15b into the central chamber 14b and through an outlet 22b into a conduit 23b by the impellers 34b and 39b.

The cooling of the stators is accomplished by providing a passage 47 extending through the impeller 34b and a passage 48 extending through the impeller 39b. The passage 47 communicates with the exterior of the impeller 34b and the interior of the stator 28b. Similarly, the passage 48 communicates with the exterior of the impeller 39b and the interior of the stator 29b. Each end of the stators communicates with the interior of the shafts through two spaced sets of circumferential openings 44b in the hollow shafts 24b and 25b. Thus, the stators 28b and 29b, attached to the shafts 24b and 25b, communicate with each other through the circumferential openings in the shafts and the end chambers 16b and 20b.

As each impeller rotates, the passage 47 or 48 therein communicates with the oxygen flowing from the housing 10b through the outlet 22b. This oxygen flows through the passage into one of the stators and through its hollow shaft into the other hollow shaft by the end chambers and into the stator attached to the other hollow shaft. When the passage 47 or 48 in the impeller is exposed to the pressure existing at the inlet 15b, the oxygen flows from the stator. Thus, the unit of Figs. 7 to 9 shows another way in which the stators are cooled by the oxygen being pumped by the impellers.

While the motor-compressor unit has been shown and described as pumping oxygen, it will be understood that any fluid may be employed. It also will be understood that the rotor windings could be disposed adjacent the hollow shafts with the stationary windings surrounding the rotary windings.

An advantage of the present invention is its compactness, which reduces the space required with respect to the space required for present motor-compressor units. Another advantage of this invention is that the requirement of seals and packing glands is eliminated. A further advantage of this invention is that it eliminates the problem of cooling an electric motor at high altitudes. Since the unit functions as both a motor and a compressor, its weight is reduced and a lower fabrication cost results. A still further advantage of this invention is that both of the compressors continue to operate on one motor if the other motor fails. Still another advantage of this invention is that the synchronous gears are not subject to stress so that the apparatus has a longer life and produces less noise. Yet another advantage of this invention is that the insulation of the windings of the motor cannot be damaged by the ionization effect in high altitudes.

For purposes of exemplification, particular embodiments of the invention have been shown and described according to the best present understanding thereof. However, it will be apparent that changes and modifications in the arrangement and construction of the parts thereof may be resorted to without departing from the true spirit and scope of the invention.

I claim:

1. A compact motor-compressor unit adapted for pumping gas in a closed circuit and wherein the driving means is sealed from the external atmosphere at high altitude comprising a casing having an inlet and an outlet and an internal chamber connected in series with said inlet and said outlet, a pair of stationary shafts mounted in parallel spaced relation in said chamber, a stator mounted on each of said shafts, electrical motor windings on each stator adapted when energized to create a rotating magnetic field around each stator, an electric motor rotor element surrounding each stator and rotatably journalled in said casing, said rotor elements each cooperating with a corresponding stator to form an electric driving motor, a multi-lobe positive displacement pump impeller positioned on each rotor element and extending radially outward therefrom, said impellers being interengaging and driven by said rotor elements, and gearing interconnecting said rotors to maintain synchronism therebetween.

2. The structure as claimed in claim 1 in which said casing is provided with a pair of chambers positioned respectively at opposite ends of said internal chamber, each shaft of said pair of shafts being hollow and communicating with cooling passages in the stator mounted thereon and with each chamber of said pair of chambers and means for passing at least a portion of the fluid passing from said inlet to said outlet through said hollow shafts and said stator cooling passages and means for discharging the cooling fluid as at least a part of the main stream of fluid discharged through said casing outlet.

3. An electric motor-compressor unit comprising a casing having a pair of end chambers and a central chamber therebetween, said central chamber having an inlet, a pair of hollow shafts mounted in the central chamber, said shafts communicating with the end chambers, a stator secured to each of the shafts, a rotor rotatably mounted on each of the shafts, means to electrically energize the stators to rotate the rotors, an impeller connected to each of the rotors, means connected to each of the rotors to synchronize the rotation of the impellers, the wall between one of said end chambers and the central chamber having an opening therein, the other of said end chambers having an outlet, said impellers pumping fluid from the inlet through the central chamber, the opening, the one end chamber, the hollow shafts, the other end chamber, and the outlet at a pressure increase, and each of said shafts having a plurality of circumferential openings therein whereby a portion of the fluid flows through the openings into the stators to cool the stators.

4. An electric motor-compressor unit comprising a casing having a plurality of chambers separated by common walls, said chambers including a central chamber having an inlet and an outlet, a pair of end chambers, and an intermediate chamber disposed between one of the end chambers and the central chamber, a pair of hollow shafts mounted in the central chamber, said shafts communicating with the end chambers, a stator secured to each of the shafts, a rotor rotatably mounted on each of the shafts, means to electrically energize the stators to rotate the rotors, an impeller connected to each of the rotors, means disposed in the intermediate chamber and connected to each of the rotors to synchronize the rotation of the impellers, said impellers pumping fluid from the inlet through the outlet at a pressure increase, the wall separating the intermediate chamber from the central chamber having an opening therein through which a portion of the fluid flows into the intermediate chamber, the wall separating the intermediate chamber from one of the end chambers having an opening therein, the synchonizing means pumping the portion of the fluid from the intermediate chamber through the last mentioned opening into the one end chamber through the hollow shafts into the other of the end chambers, and each of the shafts having a plurality of circumferential openings therein whereby a portion of the fluid flows through the openings into each of the stators to cool each of the stators, the wall separating the other end chamber from the central having an opening therein whereby a portion of the fluid flowing through the shafts returns to the central chamber to mix with the fluid being pumped through the outlet.

5. An electric motor-compressor unit comprising a casing having an inlet and an outlet, said casing having a pair of end chambers and a central chamber therebetween, a pair of hollow shafts mounted in the central chamber, said shafts communicating with the end chambers, a stator secured to each of the shafts, a rotor rotatably mounted on each of the shafts, means to electrically energize the stators to rotate the rotors, an impeller connected to each of the rotors, means connected to each of the rotors to synchronize the rotation of the impellers, said impellers pumping fluid from the inlet through the outlet at a pressure increase, each of said rotors and its connecting impeller having a passage extending therethrough from the exterior of the impeller to the interior of the stator whereby a portion of the fluid being pumped from the inlet through the outlet flows into the stators to cool the stators.

References Cited in the file of this patent

UNITED STATES PATENTS

| | | |
|---|---|---|
| 1,132,747 | Sundh | Mar. 23, 1915 |
| 1,820,985 | McKee | Sept. 1, 1931 |
| 1,921,218 | Colby | Aug. 8, 1933 |
| 2,171,460 | Thrasher | Aug. 29, 1939 |
| 2,225,908 | Garthe | Dec. 24, 1940 |
| 2,242,166 | Bennett | May 13, 1941 |
| 2,557,879 | Lewis | June 19, 1951 |
| 2,742,223 | Font | Apr. 17, 1956 |
| 2,793,506 | Moody | May 28, 1957 |
| 2,801,792 | Lindhagen et al. | Aug. 6, 1957 |